(12) United States Patent
Jiang et al.

(10) Patent No.: US 12,166,701 B2
(45) Date of Patent: Dec. 10, 2024

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 451 days.

(21) Appl. No.: 17/669,384

(22) Filed: Feb. 11, 2022

(65) Prior Publication Data

US 2022/0166571 A1    May 26, 2022

Related U.S. Application Data

(63) Continuation of application No. PCT/CN2020/104740, filed on Jul. 27, 2020.

(30) Foreign Application Priority Data

Aug. 13, 2019  (CN) .......................... 201910746282.2

(51) Int. Cl.
  *H04L 5/00* (2006.01)
  *H04L 1/1607* (2023.01)
  *H04L 1/1812* (2023.01)

(52) U.S. Cl.
  CPC .......... *H04L 5/0032* (2013.01); *H04L 1/1671* (2013.01); *H04L 1/1812* (2013.01); *H04L 5/0048* (2013.01)

(58) Field of Classification Search
  CPC ... H04L 5/0032; H04L 1/1671; H04L 1/1812; H04L 5/0048; H04L 5/0055;
  (Continued)

(56) References Cited

U.S. PATENT DOCUMENTS

2018/0098323 A1   4/2018   Zhang et al.
2018/0115966 A1   4/2018   Chen et al.
(Continued)

FOREIGN PATENT DOCUMENTS

CN    107734655 A    2/2018
CN    108029131 A    5/2018
(Continued)

OTHER PUBLICATIONS

First Office Action of Chinese patent application No. CN201910746282.2 dated Feb. 8, 2024.
(Continued)

*Primary Examiner* — Sharmin Chowdhury

(57) ABSTRACT

The present disclosure provides a method and a device in a node used for wireless communications. A first node firstly receives a first signaling and a second signaling, the first signaling indicating a first zone size and a second zone size, while the second signaling indicating a first radio resource pool and a second radio resource pool; and then determines according to the current position whether to transmit a first signal in a first radio resource set; when the first radio resource set is associated with the first radio resource pool, the first zone size is used to determine the current position. By respectively associating the first zone size and the second zone size with the first radio resource pool and the second radio resource pool, the present disclosure manages to optimize the determination of feedback transmission in sidelink, which in turn improves the spectrum efficiency of sidelink transmission.

19 Claims, 5 Drawing Sheets

(58) Field of Classification Search
CPC ... H04L 5/0094; H04L 5/0023; H04L 1/1829; H04B 7/0695; H04B 7/0617; H04W 72/51; H04W 4/40; H04W 72/046; H04W 72/0446; H04W 72/0453; H04W 72/20

See application file for complete search history.

(56) References Cited

U.S. PATENT DOCUMENTS

| | | | | |
|---|---|---|---|---|
| 2019/0158993 | A1* | 5/2019 | Kwon | H04W 76/27 |
| 2020/0053768 | A1* | 2/2020 | Chen | H04W 88/04 |
| 2020/0106588 | A1* | 4/2020 | Gulati | H04L 1/0033 |
| 2020/0396040 | A1* | 12/2020 | Miao | H04W 4/40 |
| 2020/0413348 | A1* | 12/2020 | Ryu | H04W 48/12 |
| 2021/0029692 | A1* | 1/2021 | Hui | H04W 72/044 |
| 2021/0112375 | A1* | 4/2021 | Lee | H04W 4/40 |
| 2021/0297221 | A1* | 9/2021 | Lee | H04L 5/0053 |

FOREIGN PATENT DOCUMENTS

| | | |
|---|---|---|
| CN | 109474313 A | 3/2019 |
| CN | 109600212 A | 4/2019 |
| CN | 109891981 A | 6/2019 |
| CN | 110072274 A | 7/2019 |
| EP | 3522647 A1 | 8/2019 |
| WO | 2019064983 A1 | 10/2020 |

OTHER PUBLICATIONS

First Search Report of Chinese patent application No. CN201910746282.2 dated Feb. 5, 2024.

ISR received in application No. PCT/CN2020/104740 dated Oct. 23,2020.

Sony. ""Discussion on HARQ Feedback for NR V2X Communication"" 3GPP TSG RAN WGI #97 RI-1906840, May 3, 2019 (May 3, 2019).

* cited by examiner

METHOD AND DEVICE IN NODES USED FOR WIRELESS COMMUNICATION

CROSS REFERENCE TO RELATED APPLICATIONS

This application is the continuation of International Patent Application No. PCT/CN2020/104740, filed on Jul. 27, 2020, which claims the priority benefit of Chinese Patent Application No. 201910746282.2, filed on Aug. 13, 2019, the full disclosure of which is incorporated herein by reference.

BACKGROUND

Technical Field

The present disclosure relates to transmission methods and devices in wireless communication systems, and in particular to a sidelink related transmission method and device in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In response to rapidly growing Vehicle-to-Everything (V2X) traffics, the 3GPP has started its work of standards setting and studies around the NR framework. At present, the 3GPP has finished regulations of requirements targeting the 5G V2X traffics which are included in the TS 22.886. Four major Use Case Groups have been defined as follows for the 5G V2X traffics: Vehicles Platooning, Extended Sensors, Advanced Driving and Remote Driving. And a study of V2X technologies based on NR was already initiated by the 3GPP at the RAN #80 Plenary.

SUMMARY

Compared with the existing Long-term Evolution (LTE) V2X system, NR V2X has a significant character of supporting both unicast and groupcast as well as Hybrid Automatic Repeat reQuest (HARQ) functions. The Physical Sidelink Feedback Channel (PSFCH) is introduced for a HARQ-Acknowledgement (HARQ-ACK) transmission in sidelink. According to conclusions drawn at the 3GPP RAN1 #96b conference, PSFCH resources can be periodically configured or pre-configured.

During the 3GPP RAN1 #97 Plenary, for a Groupcast HARQ-ACK, a receiving User Equipment (UE) in V2X determines whether it is necessary to send a HARQ feedback by determining its distance to a transmitting UE in V2X, thus preventing unneeded overhead of feedback channel in the sidelink in an effective way. In V2X application scenarios of the future, a base station will configure a plurality of Transmit-Receive Points (TRPs), and then configure those TRPs with different radio resource pools to be used for V2X transmission, with each TRP corresponding to a different beam coverage scenario, for instance, some TRPs are used for wide beamforming vectors which cover larger areas, and others are used for narrow beam coverage scenarios with a smaller coverage, thus, the above-mentioned scheme of determining the way of transmitting sidelink HARQs depending on positional information shall be redesigned in the multi-TRP scenario.

To address the above problem, the present disclosure provides a solution. It should be noted that in the case of no conflict, the embodiments of a first node and the characteristics in the embodiments may be applied to a second node, and vice versa. What's more, the embodiments in the present disclosure and the characteristics in the embodiments can be arbitrarily combined if there is no conflict.

The present disclosure provides a method in a first node for wireless communications, comprising:

receiving a first signaling and a second signaling, the first signaling being used to indicate a first zone size and a second zone size, while the second signaling indicating a first radio resource pool and a second radio resource pool; and determining according to a current location whether to transmit a first signal; when the determination result is yes, transmitting the first signal in a first radio resource set; when the determination result is no, dropping transmission of the first signal in a first radio resource set;

herein, when the first radio resource set is associated with the first radio resource pool, the first zone size is used to determine the current location; when the first radio resource set is associated with the second radio resource pool, the second zone size is used to determine the current location.

In one embodiment, an advantage of the above method lies in that the first radio resource pool and the second radio resource pool are respectively associated with a first TRP and a second TRP, the first TRP and the second TRP respectively correspond to a first zone size and a second zone size, which leads to different zonings configured for different TRPs; a TRP configured with smaller single zone means that in the sidelink configured for it only when two terminals are in the vicinity of each other will the PSFCH be transmitted; a TRP configured with larger single zone means that the PSFCH will still be transmitted even if there is a long distance between these two terminals in the sidelink configured for it; thus, the method of PSFCH transmission in sidelink can be optimized.

In one embodiment, another advantage of the above method lies in that when a first TRP corresponds to wide-area coverage, while a second TRP corresponds to narrow beam coverage, a V2X transmitter and receiver related to the first TRP will, even when they are distant from each other, need to feedback the PSFCH; but a pair of V2X transmitter and receiver related to the second TRP won't do this; such method allows for a more flexible decision about whether the PSFCH transmission is done, to adapt to varied scenarios and enhance the overall spectrum efficiency.

According to one aspect of the present disclosure, the above method is characterized in comprising:

transmitting a third signaling;

herein, the third signaling is used to indicate the first radio resource pool and the second radio resource pool.

In one embodiment, an advantage of the above method lies in that the first node sends configurations for the first radio resource pool and the second radio resource pool to an opposite UE in the V2X transmission, which helps the opposite UE to determine where the sidelink feedback should be received.

According to one aspect of the present disclosure, the above method is characterized in comprising:

receiving a fourth signaling;

herein, the fourth signaling is used to determine the first radio resource set.

In one embodiment, an advantage of the above method lies in that a base station gives notice to the first node by transmitting a fourth signaling that the first node is expected to transmit sidelink feedback information in a first radio resource set, making it more favorable for the base station to control and manage V2X resources.

In one embodiment, another advantage of the above method lies in that a V2X UE opposite to the first node notifies the first node by transmitting a fourth signaling that the sidelink feedback information is to be transmitted in a first radio resource set, thus enabling the opposite V2X UE to determine where to receive the feedback information in the sidelink.

According to one aspect of the present disclosure, the above method is characterized in comprising:

receiving a target signaling and a target signal;

herein, the target signaling comprises configuration information for the target signal, the first signal being used for feedback for the target signal; the target signaling and the target signal are transmitted in sidelink.

According to one aspect of the present disclosure, the above method is characterized in comprising:

receiving a fifth signaling;

herein, the fifth signaling is used to indicate a target reference signal, the target reference signal being associated with the first radio resource set.

In one embodiment, an advantage of the above method lies in that an opposite UE for the first node in V2X transmission, i.e., the third node in the present disclosure, indicates to the first node by transmitting a fifth signaling a spatial receive parameter group adopted by the third node for receiving radio signals in the first radio resource set, thus facilitating the first node's determination of a spatial transmission parameter group for transmitting the first signal, contributing to better sidelink transmission quality.

According to one aspect of the present disclosure, the above method is characterized in that the first radio resource pool and the second radio resource pool respectively correspond to a first index and a second index, the first index being different from the second index.

In one embodiment, the above method is advantageous in that associating the first radio resource pool and the second radio resource pool respectively with different indexes is beneficial to distinguishing resources, hence easier implementation of the scheme proposed above in the present disclosure.

The present disclosure provides a method in a second node for wireless communications, comprising:

transmitting a first signaling and a second signaling, the first signaling being used to indicate a first zone size and a second zone size, while the second signaling indicating a first radio resource pool and a second radio resource pool;

herein, a first node determines whether to transmit a first signal according to its current location; when the determination result is yes, the first node transmits the first signal in the first radio resource set; when the determination result is no, the first node drops transmitting the first signal in the first radio resource set; when the first radio resource set is associated with the first radio resource pool, the first zone size is used to determine the current location of the first node; when the first radio resource set is associated with the second radio resource pool, the second zone size is used to determine the current location of the first node.

According to one aspect of the present disclosure, the above method is characterized in comprising:

transmitting a fourth signaling;

herein, the fourth signaling is used to determine the first radio resource set.

According to one aspect of the present disclosure, the above method is characterized in that the first radio resource pool and the second radio resource pool respectively correspond to a first index and a second index, the first index being different from the second index.

The present disclosure provides a method in a third node for wireless communications, comprising:

transmitting a target signaling and a target signal;

detecting a first signal in a first radio resource set;

herein, the target signaling comprises configuration information for the target signal, the first signal is used for a feedback for the target signal, both the target signaling and the target signal are transmitted in sidelink; a transmitter for the first signal is a first node, and the first node determines whether to transmit a first signal according to its current location; when the determination result is yes, the first node transmits the first signal in the first radio resource set; when the determination result is no, the first node drops transmitting the first signal in the first radio resource set; when the first radio resource set is associated with a first radio resource pool, a first zone size is used to determine the current location of the first node; when the first radio resource set is associated with the second radio resource pool, the second zone size is used to determine the current location of the first node; a first signaling is used to indicate the first zone size and the second zone size, while a second signaling indicates the first radio resource pool and the second radio resource pool.

According to one aspect of the present disclosure, the above method is characterized in comprising:

receiving a third signaling;

herein, the third signaling is used to indicate the first radio resource pool and the second radio resource pool.

According to one aspect of the present disclosure, the above method is characterized in comprising:

transmitting a fourth signaling;

herein, the fourth signaling is used to determine the first radio resource set.

According to one aspect of the present disclosure, the above method is characterized in comprising:

transmitting a fifth signaling;

herein, the fifth signaling is used to indicate a target reference signal, the target reference signal being associated with the first radio resource set.

According to one aspect of the present disclosure, the above method is characterized in that the first radio resource pool and the second radio resource pool respectively correspond to a first index and a second index, the first index being different from the second index.

The present disclosure provides a first node for wireless communications, comprising:

a first receiver, receiving a first signaling and a second signaling, the first signaling being used to indicate a first zone size and a second zone size, while the second signaling indicating a first radio resource pool and a second radio resource pool; and a first transceiver, determining according to a current location whether to transmit a first signal; when the determination result is yes, transmitting the first signal in a first radio resource set; when the determination result is no, dropping transmission of the first signal in a first radio resource set;

herein, when the first radio resource set is associated with the first radio resource pool, the first zone size is used to determine the current location; when the first radio resource set is associated with the second radio resource pool, the second zone size is used to determine the current location.

The present disclosure provides a second node for wireless communications, comprising:

a first transmitter, transmitting a first signaling and a second signaling, the first signaling being used to indicate a first zone size and a second zone size, while the second signaling indicating a first radio resource pool and a second radio resource pool;

herein, a first node determines whether to transmit a first signal according to its current location; when the determination result is yes, the first node transmits the first signal in the first radio resource set; when the determination result is no, the first node drops transmitting the first signal in the first radio resource set; when the first radio resource set is associated with the first radio resource pool, the first zone size is used to determine the current location of the first node; when the first radio resource set is associated with the second radio resource pool, the second zone size is used to determine the current location of the first node.

The present disclosure provides a third node for wireless communications, comprising:

a second transmitter, transmitting a target signaling and a target signal; and a second receiver, detecting a first signal in a first radio resource set;

herein, the target signaling comprises configuration information for the target signal, the first signal is used for a feedback for the target signal, both the target signaling and the target signal are transmitted in sidelink; a transmitter for the first signal is a first node, and the first node determines whether to transmit a first signal according to its current location; when the determination result is yes, the first node transmits the first signal in the first radio resource set; when the determination result is no, the first node drops transmitting the first signal in the first radio resource set; when the first radio resource set is associated with a first radio resource pool, a first zone size is used to determine the current location of the first node; when the first radio resource set is associated with the second radio resource pool, the second zone size is used to determine the current location of the first node; a first signaling is used to indicate the first zone size and the second zone size, while a secons signaling indicates the first radio resource pool and the second radio resource pool.

In one embodiment, compared with the prior art, the present disclosure is advantageous in the following aspects:

the first radio resource pool and the second radio resource pool are respectively associated with a first TRP and a second TRP, the first TRP and the second TRP respectively corresponding to a first zone size and a second zone size, thus, different zonings can be configured to different TRPs; a smaller single zone for a TRP means that a PSFCH is transmitted only in the case when two terminals in its configured sidelink are near to each other, while a larger single zone for a TRP means that the PSFCH is still transmitted even when two terminals in its configured sidelink are distant from each other; thus, the sidelink PSFCH transmission can be optimized when a first TRP corresponds to wide-area coverage while a second TRP corresponds to narrow beam coverage, the first TRP-related pair of V2X transmitter and receiver will have to feedback a PSFCH even if they are distant; but it is unnecessary for the pair related to the second TRP to do so; the method above makes it more flexible to decide whether to transmit the PSFCH or not, for better adaptability to varied scenarios and improved spectrum efficiency.

a UE opposite to the first node in V2X communications, i.e., the third node in the present disclosure, sends a fifth signaling to indicate to the first node a spatial receive parameter group adopted by the third node for receiving radio signals in the first radio resource set, making it easier for the first node to determine a spatial transmission parameter group for transmitting the first signal, thus enhancing the sidelink transmission quality.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
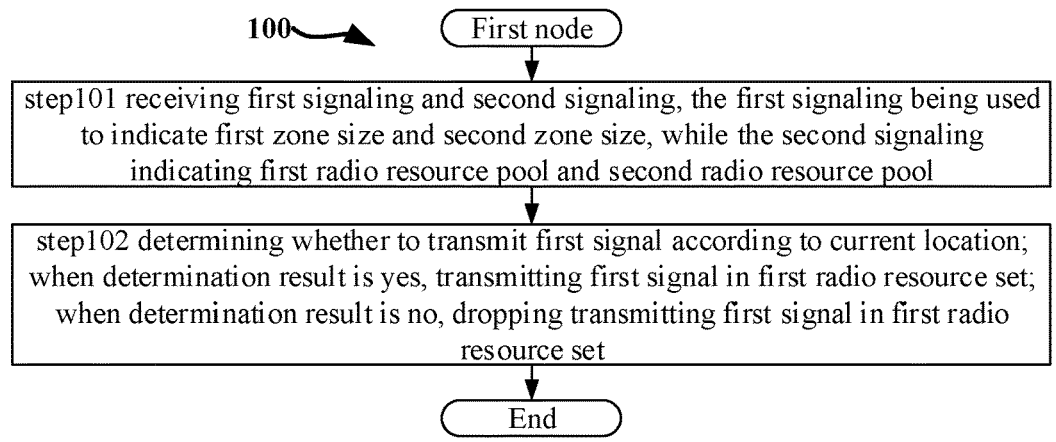
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, the first node in the present disclosure receives a first signaling and a second signaling in step 101, the first signaling being used to indicate a first zone size and a second zone size, while the second signaling indicating a first radio resource pool and a second radio resource pool; and determines in step 102 according to a current location whether to transmit a first signal; when the determination result is yes, transmitting the first signal in a first radio resource set; when the determination result is no, dropping transmission of the first signal in a first radio resource set.

In Embodiment 1, when the first radio resource set is associated with the first radio resource pool, the first zone size is used to determine the current location; when the first radio resource set is associated with the second radio resource pool, the second zone size is used to determine the current location.

In one embodiment, the first signaling and the second signaling are transmitted in downlink, while the first signal is transmitted in sidelink.

In one embodiment, both the first signaling and the second signaling are transmitted by a base station corresponding to a serving cell for the first node.

In one embodiment, the first signaling and the second signaling are respectively transmitted by two TRPs of a base station.

In one embodiment, the first signaling and the second signaling are transmitted by a same serving cell.

In one embodiment, the first signaling is Cell Common.

In one embodiment, the first signaling is for the first node.

In one embodiment, the first signaling is a higher layer signaling.

In one embodiment, the first signaling is a Radio Resource Control (RRC) signaling.

In one embodiment, the second signaling is Cell Common

In one embodiment, the second signaling is for the first node.

In one embodiment, the second signaling is a higher layer signaling.

In one embodiment, the second signaling is an RRC signaling.

In one embodiment, the first signal is transmitted on a Physical Sidelink Shared CHannel (PSSCH).

In one embodiment, the first signal is transmitted in a PSFCH.

In one embodiment, the first signal is transmitted in a Physical Sidelink Control Channel (PSCCH).

In one embodiment, an identifier for a first serving cell is used for generating the first signaling and the first signal.

In one subembodiment, the first serving cell is a serving cell for the first node, and the identifier for the first serving cell is a Physical Cell Identification (PCI) of the first serving cell.

In one subembodiment, the identifier for the first serving cell is an integer.

In one subembodiment, the identifier for the first serving cell is a non-negative integer less than 1024.

In one subembodiment, the identifier for the first serving cell is a non-negative integer less than 65536.

In one subembodiment, the phrase that a first serving cell identifier is used to generate the first signaling and the first signal has a meaning that a transmitter for the first signaling and a receiver for the first signal are the serving cell.

In one subembodiment, the phrase that a first serving cell identifier is used to generate the first signaling and the first signal has a meaning that the first serving cell identifier is used for scrambling of the first signaling and the first signal.

In one embodiment, the first radio resource set comprises time-domain resources and frequency-domain resources.

In one embodiment, the first radio resource set comprises code-domain resources.

In one embodiment, the first radio resource set comprises spatial-domain resources.

In one embodiment, the first radio resource set corresponds to an antenna port.

In one embodiment, the first radio resource set corresponds to a reference signal.

In one embodiment, the first radio resource set corresponds to a beamforming vector.

In one embodiment, the first radio resource set occupies a positive integer number of multicarrier symbol(s) in time domain, and a positive integer number of subcarrier(s) in frequency domain.

In one embodiment, the first radio resource set occupies M1 multicarrier symbol(s) in time domain, and frequency-domain resources corresponding to M2 Resource Block(s) (RB(s)) in frequency domain, where M1 and M2 are both positive integers.

In one embodiment, the first radio resource pool and the second radio resource pool are maintained by a same serving cell.

In one embodiment, the first radio resource pool comprises K1 radio resource set(s), while the second radio resource pool comprises K2 radio resource set(s), where K1 and K2 are positive integers.

In one subembodiment, any of the K1 radio resource set(s) occupies a positive integer number of multicarrier symbol(s) in time domain, and a positive integer number of subcarrier(s) in frequency domain.

In one subembodiment, any of the K1 radio resource set(s) occupies M3 multicarrier symbol(s) in time domain, and frequency-domain resources corresponding to M4 RB(s) in frequency domain, where M3 and M4 are both positive integers.

In one subembodiment, any of the K2 radio resource set(s) occupies a positive integer number of multicarrier symbol(s) in time domain, and a positive integer number of subcarrier(s) in frequency domain.

In one subembodiment, any of the K2 radio resource set(s) occupies M5 multicarrier symbol(s) in time domain, and frequency-domain resources corresponding to M6 RB(s) in frequency domain, where M5 and M6 are both positive integers.

In one subembodiment, any of the K1 radio resource set(s) comprises a Physical Uplink Control Channel (PUCCH) Resource.

In one subembodiment, any of the K2 radio resource set(s) comprises a PUCCH resource.

In one subembodiment, any of the K1 radio resource set(s) comprises time-domain resources and frequency-domain resources.

In one subembodiment, any of the K2 radio resource set(s) comprises time-domain resources and frequency-domain resources.

In one subembodiment, any of the K1 radio resource set(s) comprises code-domain resources.

In one subembodiment, any of the K2 radio resource set(s) comprises code-domain resources.

In one subembodiment, any of the K1 radio resource set(s) comprises spatial-domain resources.

In one subembodiment, any of the K2 radio resource set(s) comprises spatial-domain resources.

In one subembodiment, the first radio resource set is one of the K1 radio resource set(s).

In one subembodiment, the first radio resource set is one of the K2 radio resource set(s).

In one embodiment, the spatial-domain resources in the present disclosure comprise a transmission antenna port.

In one embodiment, spatial-domain resources comprised by a said radio resource set in the present disclosure comprise: a target Reference Signal (RS) which is Quasi co-located (QCL) with a transmission antenna port in the radio resource set.

In one embodiment, spatial-domain resources comprised by a said radio resource set in the present disclosure comprise: a beam direction corresponding to a transmission antenna port employed by the radio resource set.

In one embodiment, spatial-domain resources comprised by a said radio resource set in the present disclosure comprise: an analog beamforming vector corresponding to a transmission antenna port employed by the radio resource set.

In one embodiment, spatial-domain resources comprised by a said radio resource set in the present disclosure comprise: a digital beamforming vector corresponding to a transmission antenna port employed by the radio resource set.

In one embodiment, the phrase that the first radio resource set is associated with the first radio resource pool has a meaning that the first radio resource set is one of K1 radio resource set(s) comprised in the first radio resource pool.

In one embodiment, the phrase that the first radio resource set is associated with the first radio resource pool has a meaning that the first radio resource set and the first radio resource pool are configured to be a same transmission antenna port.

In one embodiment, the phrase that the first radio resource set is associated with the first radio resource pool has a meaning that the first radio resource set and the first radio resource pool adopt a same transmission antenna port.

In one embodiment, the phrase that the first radio resource set is associated with the first radio resource pool has a meaning that the first radio resource set and the first radio resource pool correspond to a same RS.

In one embodiment, the phrase that the first radio resource set is associated with the first radio resource pool has a meaning that an RS which is QCL with a transmission antenna port adopted by the first radio resource set is the same as an RS which is QCL with a transmission antenna port for the first radio resource pool.

In one embodiment, the phrase that the first radio resource set is associated with the second radio resource pool has a meaning that the first radio resource set is one of K2 radio resource set(s) comprised in the second radio resource pool.

In one embodiment, the phrase that the first radio resource set is associated with the second radio resource pool has a meaning that the first radio resource set and the second radio resource pool are configured to be a same transmission antenna port.

In one embodiment, the phrase that the first radio resource set is associated with the second radio resource pool has a meaning that the first radio resource set and the second radio resource pool adopt a same transmission antenna port.

In one embodiment, the phrase that the first radio resource set is associated with the second radio resource pool has a meaning that the first radio resource set and the second radio resource pool correspond to a same RS.

In one embodiment, the phrase that the first radio resource set is associated with the second radio resource pool has a meaning that an RS which is QCL with a transmission antenna port adopted by the first radio resource set is the same as an RS which is QCL with a transmission antenna port for the second radio resource pool.

In one embodiment, two antenna ports being QCL means that all or partial large-scale properties of a radio signal transmitted from one of the two antenna ports can be used to infer all or partial large-scale properties of a radio signal transmitted from the other of the two antenna ports; the large-scale properties include one or more of Delay Spread, Doppler Spread, Doppler Shift, Path Loss or Average Gain.

In one embodiment, two RSs being QCL means that all or partial large-scale properties borne by one of the two RSs can be used to infer all or partial large-scale properties borne by the other of the two RSs; the large-scale properties include one or more of Delay Spread, Doppler Spread, Doppler Shift, Path Loss or Average Gain.

In one embodiment, an RS and an antenna port being QCL means that all or partial large-scale properties borne by the RS can be used to infer all or partial large-scale properties of a radio signal transmitted from the antenna port; the large-scale properties include one or more of Delay Spread, Doppler Spread, Doppler Shift, Path Loss or Average Gain.

In one embodiment, the phrase of dropping transmission of a first signal in a first radio resource set comprises: maintaining zero-transmit power in the first radio resource set.

In one embodiment, the phrase of dropping transmission of a first signal in a first radio resource set comprises: releasing a buffer storing a target information bit, the target information bit being used to generate the first signal.

In one embodiment, the phrase of dropping transmission of a first signal in a first radio resource set comprises: transmitting one or more other signals in the first radio resource set, the other signal(s) being irrelevant to any information bit carried by the first signal.

In one embodiment, the QCL includes QCL-Type D in a New Radio (NR) system.

In one embodiment, the QCL includes QCL-Type A in an NR system.

In one embodiment, the QCL includes QCL-Type B in an NR system.

In one embodiment, the QCL includes QCL-Type C in an NR system.

In one embodiment, the QCL includes QCL-Type D in TS 36.214.

In one embodiment, the QCL includes QCL-Type A in TS 36.214.

In one embodiment, the QCL includes QCL-Type B in TS 36.214.

In one embodiment, the QCL includes QCL-Type C in TS 36.214.

In one embodiment, the phrase that the first radio resource set is associated with the first radio resource pool has a meaning that a transmission antenna port for the first radio resource set is QCL with one or more transmission antenna ports for at least one radio resource set in the first radio resource pool.

In one embodiment, the phrase that the first radio resource set is associated with the second radio resource pool has a meaning that a transmission antenna port for the first radio resource set is QCL with one or more transmission antenna ports for at least one radio resource set in the second radio resource pool.

In one embodiment, the phrase that the first radio resource set is associated with the first radio resource pool has a meaning that a transmission antenna port for the first radio resource set is QCL with a first reference signal, and one or more transmission antenna ports for at least one radio resource set in the first radio resource pool is QCL with the first reference signal.

In one embodiment, the phrase that the first radio resource set is associated with the second radio resource pool has a meaning that a transmission antenna port for the first radio resource set is QCL with a second reference signal, and one or more transmission antenna ports for at least one radio resource set in the second radio resource pool is QCL with the second reference signal.

In one embodiment, the first signal is transmitted in Sidelink.

In one embodiment, the first signal is a HARQ-ACK for a data channel in sidelink.

In one embodiment, the first signal is a Feedback for sidelink.

In one embodiment, the first zone size identifiers the size of a zone.

In one subembodiment, the size of the zone is associated with a first TRP, the first TRP being a TRP comprised by a serving cell for the first node.

In one embodiment, the first zone size is comprised of a first zone length and a first zone width, the first zone length is equal to X1 meters, and the first zone width is equal to Y1 meters, where X1 and Y1 are both positive integers greater than 1.

In one subembodiment, a product of the X1 and Y1 represents what the first zone size is.

In one subembodiment, the first zone length equals a zoneLength in TS 36.331, while the first zone width equals a zoneWidth in TS 36.331.

In one embodiment, the second zone size identifiers the size of a zone.

In one subembodiment, the size of the zone is associated with a second TRP, the second TRP being a TRP comprised by a serving cell for the first node.

In one embodiment, the second zone size is comprised of a second zone length and a second zone width, the second zone length is equal to X2 meters, and the second zone width is equal to Y2 meters, where X2 and Y2 are both positive integers greater than 1.

In one subembodiment, a product of the X2 and Y2 represents what the second zone size is.

In one subembodiment, the second zone length equals a zoneLength in TS 36.331, while the second zone width equals a zoneWidth in TS 36.331.

In one embodiment, the first signaling is SL-ZoneConfig in TS 36.331.

In one embodiment, the phrase that the first zone size is used to determine the current location includes a meaning that the first node determines a target zone to which a current location of the first node belongs by referring to the first zone size, the target zone corresponding to a first zone identifier.

In one subembodiment, the target zone is used to determine information for the first node's location relative to a base station for a serving cell for the first node according to the first zone size.

In one subembodiment, the target zone is used to determine information for the first node's location relative to the first TRP in the present disclosure according to the first zone size.

In one embodiment, the phrase that the second zone size is used to determine the current location includes a meaning that the first node determines a target zone to which a current location of the first node belongs by referring to the second zone size, the target zone corresponding to a first zone identifier.

In one subembodiment, the target zone is used to determine information for the first node's location relative to a base station for a serving cell for the first node according to the second zone size.

In one subembodiment, the target zone is used to determine information for the first node's location relative to the second TRP in the present disclosure according to the first zone size.

In one embodiment, the first zone identifier in the present disclosure is a ZoneID.

In one embodiment, the first zone identifier in the present disclosure is a non-negative integer.

In one embodiment, the phrase of determining the current location means determining a first zone identifier corresponding to a geographic location of the first node.

In one embodiment, the first signal comprises Channel State Information (CSI) for sidelink.

In one embodiment, the first signal comprises a Channel Quality Indicator (CQI) for sidelink.

In one embodiment, the first signal comprises a Rank Indicator (RI) for sidelink.

In one embodiment, the first signal is a radio signal.

In one embodiment, the first signal is a baseband signal.

In one embodiment, the multicarrier symbol in the present disclosure is an Orthogonal Frequency Division Multiplexing (OFDM) Symbol.

In one embodiment, the multicarrier symbol in the present disclosure is a Single Carrier-Frequency Division Multiple Access (SC-FDMA) symbol.

In one embodiment, the multicarrier symbol in the present disclosure is a Filter Bank Multi Carrier (FBMC) symbol.

In one embodiment, the multicarrier symbol in the present disclosure is an OFDM symbol containing Cyclic Prefix (CP).

In one embodiment, the multicarrier symbol in the present disclosure is a Discrete Fourier Transform Spreading Orthogonal Frequency Division Multiplexing (DFT-s-OFDM) symbol containing CP.

In one embodiment, the sidelink refers to a radio link between terminal devices.

In one embodiment, the first signaling and the second signaling are transmitted in a cellular link.

In one embodiment, a receiver for the first signal includes a terminal.

In one embodiment, the cellular link in the present disclosure is a radio link between a terminal and a base station.

In one embodiment, the sidelink in the present disclosure corresponds to a PC5 interface.

In one embodiment, the cellular link in the present disclosure corresponds to a Uu interface.

In one embodiment, the sidelink in the present disclosure is used for V2X communications.

In one embodiment, the cellular link in the present disclosure is used for cellular communications.

In one embodiment, the first signal is a feedback signal for V2X model transmission.

Embodiment 2

Figure 2:
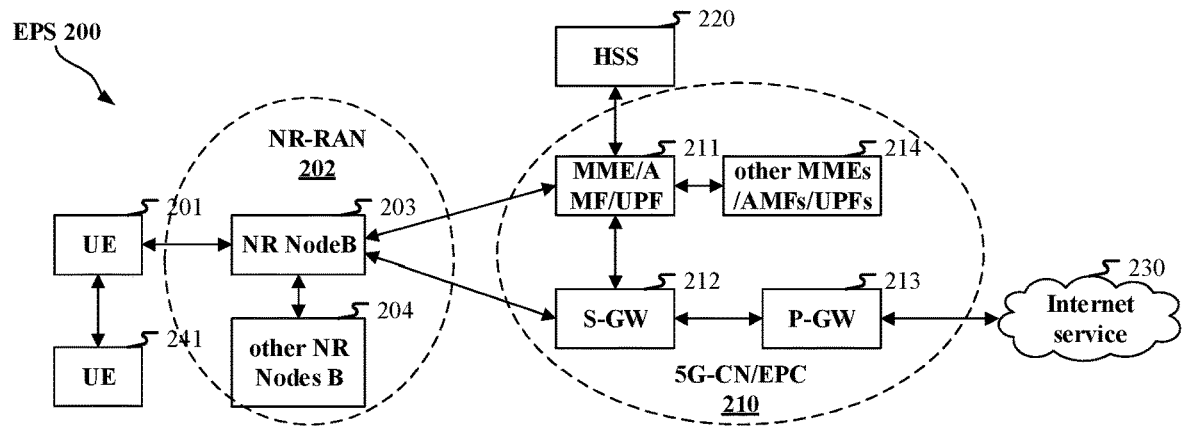
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LIE network architecture 200 may be called an Evolved Packet System (EPS) 200 or other suitable terminology. The EPS 200 may comprise one or more UEs 201, a UE 241 in sidelink communication with the UE(s) 201, an NG-RAN 202, a Evolved Packet Core/5G-Core Network (EPC-5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the gNB203 corresponds to the third node in the present disclosure.

In one embodiment, the UE 241 corresponds to the second node in the present disclosure.

In one embodiment, an air interface between the UE201 and the gNB203 is a Uu interface.

In one embodiment, an air interface between the UE201 and the UE241 is a PC-5 interface.

In one embodiment, a radio link between the UE201 and the gNB203 is a cellular link.

In one embodiment, a radio link between the UE201 and the UE241 is a sidelink.

In one embodiment, the first node in the present disclosure is a terminal within the coverage of the gNB203.

In one embodiment, the second node in the present disclosure is a terminal within the coverage of the gNB203.

In one embodiment, the second node in the present disclosure is a terminal out of the coverage of the gNB203.

In one embodiment, unicast transmission is supported between the UE 201 and the UE 241.

In one embodiment, broadcast transmission is supported between the UE 201 and the UE 241.

In one embodiment, groupcast transmission is supported between the UE 201 and the UE 241.

In one embodiment, the first node and the second node belong to a V2X Pair.

In one embodiment, the first node is an automobile.

In one embodiment, the first node is a vehicle.

In one embodiment, the second node is a base station.

In one embodiment, the second node is a serving cell.

In one embodiment, the third node is a vehicle.

In one embodiment, the third node is an automobile.

In one embodiment, the third node is a Road Side Unit (RSU).

In one embodiment, the third node is a Group Header of a terminal group.

In one embodiment, the first node is an RSU.

In one embodiment, the first node is a Group Header of a terminal group.

In one embodiment, the first node is capable of positioning.

In one embodiment, the third node is capable of positioning.

In one embodiment, the first node has the Global Positioning System (GPS) capability.

In one embodiment, the third node has the GPS capability.

Embodiment 3

Figure 3:
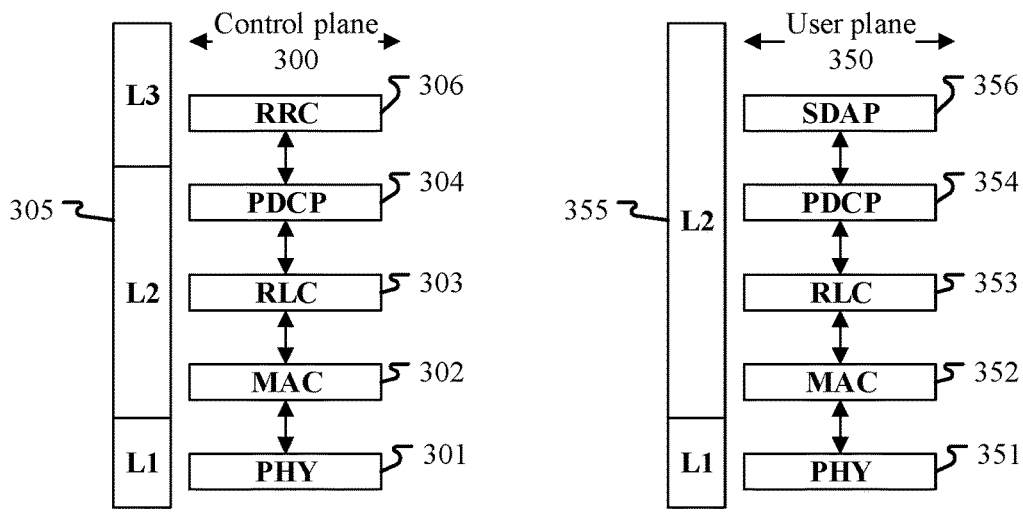
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are layer 1, layer 2 and layer 3. The layer 1 (L1) is the lowest layer which performs signal processing functions of various PHY layers. The L1 is called PHY 301 in the present disclosure. The layer 2 (L2)

305 is above the PHY 301, and is in charge of the link between a first communication node and a second communication node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first signaling is generated by the MAC 352, or the MAC 302.

In one embodiment, the first signaling is generated by the RRC 306.

In one embodiment, the second signaling is generated by the MAC 352, or the MAC 302.

In one embodiment, the second signaling is generated by the RRC 306.

In one embodiment, the first signal is generated by the PHY 301, or the PHY 351.

In one embodiment, the first signal is generated by the MAC 352, or the MAC 302.

In one embodiment, the third signaling is generated by the MAC 352, or the MAC 302.

In one embodiment, the third signaling is generated by the RRC 306.

In one embodiment, the fourth signaling is generated by the PHY 301, or the PHY 351.

In one embodiment, the fourth signaling is generated by the MAC 352, or the MAC 302.

In one embodiment, the fourth signaling is generated by the RRC 306.

In one embodiment, the target signaling is generated by the PHY 301, or the PHY 351.

In one embodiment, the target signal is generated by the PHY 301, or the PHY 351.

In one embodiment, the target signal is generated by the MAC 352, or the MAC 302.

In one embodiment, the fifth signaling is generated by the PHY 301, or the PHY 351.

In one embodiment, the fifth signaling is generated by the MAC 352, or the MAC 302.

In one embodiment, the fifth signaling is generated by the RRC 306.

Embodiment 4

Figure 4:
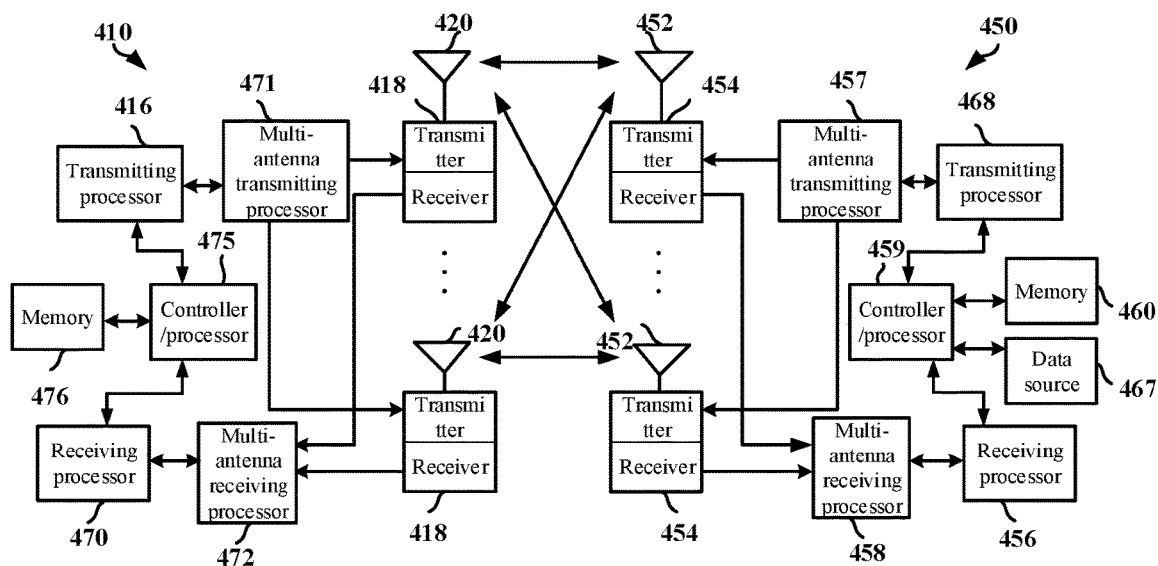
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also responsible for a retransmission of a lost packet, and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multi-carrier symbol stream to be provided to the receiving processor 456. The receiving processor 456 and the multi-antenna receiving processor 458 perform signal processing functions of the L1 layer. The multi-antenna receiving processor 458 performs reception analog precoding/beam-forming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also in charge of a retransmission of a lost packet and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least receives a first signaling and a second signaling, the first signaling being used to indicate a first zone size and a second zone size, while the second signaling indicating a first radio resource pool and a second radio resource pool; and determines whether to transmit a first signal according to its current location; when the determination result is yes, transmits the first signal in the first radio resource set; when the determination result is no, drops transmitting the first signal in the first radio resource set; when the first radio resource set is associated with the first radio resource pool, the first zone size is used to determine the current location; when the first radio resource set is associated with the second radio resource pool, the second zone size is used to determine the current location.

In one embodiment, the first communication node 450 comprises a memory that stores a computer readable instruction program, the computer readable instruction program generates actions when executed by at least one processor, which include: receiving a first signaling and a second signaling, the first signaling being used to indicate a first zone size and a second zone size, while the second signaling indicating a first radio resource pool and a second radio resource pool; and determining whether to transmit a first signal according to its current location; when the determination result is yes, transmitting the first signal in the first radio resource set; when the determination result is no, dropping transmission of the first signal in the first radio resource set; when the first radio resource set is associated with the first radio resource pool, the first zone size is used to determine the current location; when the first radio resource set is associated with the second radio resource pool, the second zone size is used to determine the current location.

In one embodiment, the second communication device 410 comprises at least one processor and at least one memory. The at least one memory comprises computer program codes; the at least one memory and the computer program codes are configured to be used in collaboration with the at least one processor. The second communication device 410 at least transmits a first signaling and a second signaling, the first signaling being used to indicate a first zone size and a second zone size, while the second signaling indicating a first radio resource pool and a second radio resource pool; a first node determines whether to transmit a first signal according to its current location; when the determination result is yes, the first node transmits the first signal in the first radio resource set; when the determination result is no, the first node drops transmitting the first signal in the first radio resource set; when the first radio resource set is associated with the first radio resource pool, the first zone size is used to determine the current location of the first node; when the first radio resource set is associated with the second radio resource pool, the second zone size is used to determine the current location of the first node.

In one embodiment, the second communication device 410 comprises a memory that stores a computer readable instruction program, the computer readable instruction program generates actions when executed by at least one processor, which include: transmitting a first signaling and a second signaling, the first signaling being used to indicate a first zone size and a second zone size, while the second signaling indicating a first radio resource pool and a second radio resource pool; a first node determines whether to transmit a first signal according to its current location; when the determination result is yes, the first node transmits the first signal in the first radio resource set; when the determination result is no, the first node drops transmitting the first signal in the first radio resource set; when the first radio resource set is associated with the first radio resource pool, the first zone size is used to determine the current location of the first node; when the first radio resource set is associated with the second radio resource pool, the second zone size is used to determine the current location of the first node.

In one embodiment, the second communication device 410 comprises at least one processor and at least one memory. The at least one memory comprises computer program codes; the at least one memory and the computer program codes are configured to be used in collaboration with the at least one processor. The second communication device 410 at least transmits a target signaling and a target signal; and detects a first signal in a first radio resource set; the target signaling comprises configuration information for the target signal, while the first signal is used for a feedback for the target signal; the target signaling and the target signal are transmitted in sidelink; a transmitter for the first signal is a first node, and a first node determines whether to transmit a first signal according to its current location; when the determination result is yes, the first node transmits the first signal in the first radio resource set; when the determination result is no, the first node drops transmitting the first signal in the first radio resource set; when the first radio resource set is associated with the first radio resource pool, the first zone size is used to determine the current location of the first node; when the first radio resource set is associated with the second radio resource pool, the second zone size is used to determine the current location of the first node.

In one embodiment, the second communication device 410 comprises a memory that stores a computer readable instruction program, the computer readable instruction program generates actions when executed by at least one processor, which include: transmitting a target signaling and a target signal; and detecting a first signal in a first radio resource set; the target signaling comprises configuration information for the target signal, the first signal is used for a feedback for the target signal, both the target signaling and the target signal are transmitted in sidelink; a transmitter for the first signal is a first node, and a first node determines whether to transmit a first signal according to its current location; when the determination result is yes, the first node transmits the first signal in the first radio resource set; when the determination result is no, the first node drops transmitting the first signal in the first radio resource set; when the first radio resource set is associated with the first radio resource pool, the first zone size is used to determine the current location of the first node; when the first radio resource set is associated with the second radio resource pool, the second zone size is used to determine the current location of the first node.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the first communication device 450 is a UE.

In one embodiment, the second communication device 410 is abase station.

In one embodiment, the second communication device 410 is a UE.

In one embodiment, at least one of the antenna 452, the receiver 454, the multi-antenna receiving processor 458, the receiving processor 456, or the controller/processor 459 is used to receive the first signaling and the second signaling, the first signaling being used to indicate a first zone size and a second zone size, while the second signaling being used to indicate a first radio resource pool and a second radio resource pool; at least one of the antenna 420, the transmitter 418, the multi-antenna transmitting processor 471, the transmitting processor 416, or the controller/processor 475 is used to transmit the first signaling and the second signaling, the first signaling being used to indicate a first zone size and a second zone size, while the second signaling being used to indicate a first radio resource pool and a second radio resource pool.

In one embodiment, at least one of the antenna 452, the transmitter 454, the multi-antenna transmitting processor 457, the transmitting processor 468 or the controller/processor 459 is used to determine whether to transmit a first signal according to the current location; when the determination is yes, transmit the first signal in the first radio resource set; when the determination is no, drop transmitting the first signal in the first radio resource set.

In one embodiment, at least one of the antenna 420, the receiver 418, the multi-antenna receiving processor 472, the receiving processor 470, or the controller/processor 475 is used for receiving a first signal.

In one embodiment, at least one of the antenna 452, the transmitter 454, the multi-antenna transmitting processor 457, the transmitting processor 468, or the controller/processor 459 is used to transmit the third signaling; at least one of the antenna 420, the receiver 418, the multi-antenna receiving processor 472, the receiving processor 470 or the controller/processor 475 is used to receive the third signaling.

In one embodiment, at least one of the antenna 452, the receiver 454, the multi-antenna receiving processor 458, the receiving processor 456, or the controller/processor 459 is used to receive the fourth signaling; at least one of the antenna 420, the transmitter 418, the multi-antenna transmitting processor 471, the transmitting processor 416, or the controller/processor 475 is used to transmit the fourth signaling.

In one embodiment, at least one of the antenna 452, the receiver 454, the multi-antenna receiving processor 458, the receiving processor 456, the controller/processor 459 is used to receive the target signaling and the target signal; at least one of the antenna 420, the transmitter 418, the transmitting processor 471, the multi-antenna transmitting processor 416, or the controller/processor 475 is used to transmit the target signaling and the target signal.

In one embodiment, at least one of the antenna 452, the receiver 454, the multi-antenna receiving processor 458, the receiving processor 456, or the controller/processor 459 is used to receive the fifth signaling; at least one of the antenna 420, the transmitter 418, the multi-antenna transmitting processor 471, the transmitting processor 416, or the controller/processor 475 is used to transmit the fifth signaling.

Embodiment 5

Figure 5:
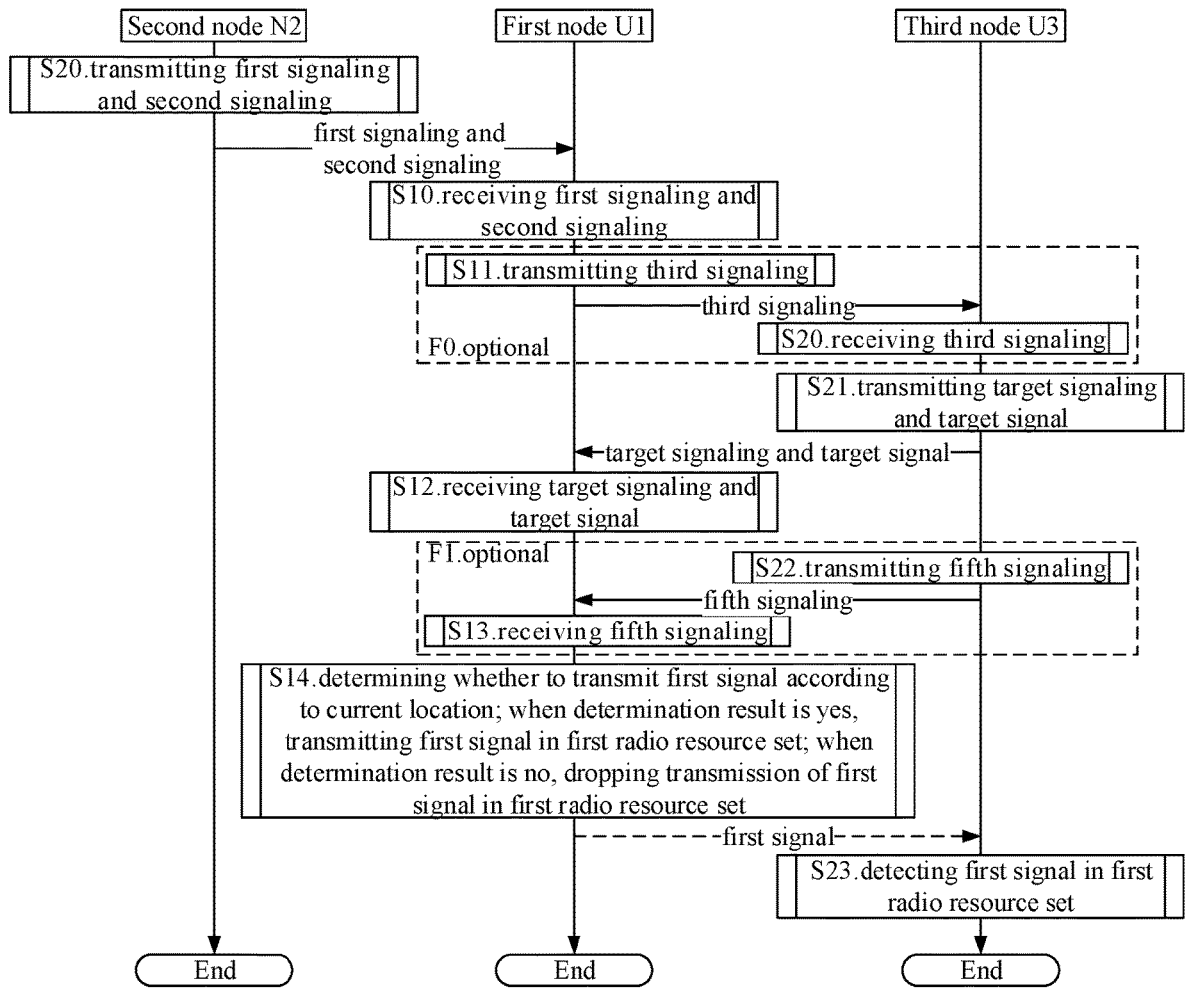
FIG. 5 illustrates a flowchart of a first signal according to one embodiment of the present disclosure.

Embodiment 5 illustrates a flowchart of a first signal, as shown in FIG. 5. In FIG. 5, a first node U1 and a second node U2 are in communication via a sidelink, while the first node U1 and a third node N3 are in communication via a cellular link; steps marked by the box F0 and the box F1 are optional; where the steps enclosed by dotted lines implies that its operations are subject to the decision made in the step S14.

The first node U1 receives a first signaling and a second signaling in step S10; transmits a third signaling in step S11; and receives a target signaling and a target signal in step S12; receives a fifth signaling in step S13; and determines in step S14 according to a current location whether to transmit a first signal; when the determination result is yes, transmit the first signal in a first radio resource set; when the determination result is no, drop transmission of the first signal in a first radio resource set.

The second node N2 transmits a first signaling and a second signaling in step S20.

The third node U3 receives a third signaling in step S30; transmits a target signaling and a target signal in step S31; transmits a fifth signaling in step S32; and detects a first signal in a first radio resource set in step S33.

In Embodiment 5, when the first radio resource set is associated with the first radio resource pool, the first zone size is used to determine a current location of the first node U1; when the first radio resource set is associated with the second radio resource pool, the second zone size is used to determine a current location of the first node U1; the third signaling is used to indicate the first radio resource pool and the second radio resource pool; the target signaling comprises configuration information for the target signal, the first signal being used for feedback for the target signal; the target signaling and the target signal are transmitted in sidelink; the fifth signaling is used to indicate a target reference signal, the target reference signal being associated with the first radio resource set; the first radio resource pool and the second radio resource pool respectively correspond to a first index and a second index, the first index being different from the second index.

In one embodiment, the third signaling is a higher layer signaling.

In one embodiment, the third signaling is an RRC signaling.

In one embodiment, the third signaling is a signaling on a PC 5 interface.

In one embodiment, the first signaling and the second signaling are transmitted in downlink, while the third signaling is transmitted in sidelink.

In one embodiment, the first radio resource pool is associated with the first TRP in the present disclosure, while the second radio resource pool is associated with the second TRP in the present disclosure, the first TRP and the second TRP are two TRPs under a serving cell for the first node, the first index is used to indicate the first TRP, while the second index is used to indicate the second TRP.

In one subembodiment, the third signal comprises the first index and the second index.

In one subembodiment, the first index and the second index are respectively two non-negative integers.

In one embodiment, the target signaling is Sidelink Control Information (SCI).

In one embodiment, the target signaling and the fourth signaling belong to a same piece of SCI.

In one embodiment, the target signaling is used for scheduling the target signal.

In one embodiment, the configuration information comprises a Modulation and Coding Scheme (MCS) employed by the target signal.

In one embodiment, the configuration information comprises DeModulation Reference Signals (DMRS) of the target signal.

In one embodiment, the DMRS configuration information comprises one or more of a port for the DMRS, occupied time-domain resource, occupied frequency-domain resource, occupied code-domain resource, an RS sequence, a mapping mode, a DMRS type, a cyclic shift, or an Orthogonal Cover Code (OCC).

In one embodiment, the configuration information comprises a New Data Indicator (NDI) corresponding to the target signal.

In one embodiment, the configuration information comprises a Redundancy Version (RV) corresponding to the target signal.

In one embodiment, the configuration information comprises time-domain resources occupied by the target signal.

In one embodiment, the configuration information comprises frequency-domain resources occupied by the target signal.

In one embodiment, the third node U3 and the second node N2 are non-co-located.

In one embodiment, the third node U3 in the present disclosure is a terminal.

In one embodiment, the third node U3 and the first node U1 are in V2X communications.

In one embodiment, the third node U3 and the first node U1 belong to a same serving cell.

In one embodiment, the third node U3 and the first node U1 are served by a same serving cell.

In one embodiment, the third node U3 and the first node U1 are respectively served by different serving cells.

In one embodiment, the target signaling is used to indicate a second zone identifier, and the second zone identifier is used to indicate where the third node U3 is located.

In one subembodiment, the second zone identifier and the first zone identifier are used by the first node U1 to determine whether to transmit the first signal.

In one subsidiary embodiment of the above subembodiment, the second zone identifier and the first zone identifier are jointly used to determine that a distance between the third node U3 and the first node U1 is no greater than a first threshold, the first node U1 transmits the first signal in the first radio resource set.

In one subsidiary embodiment of the above subembodiment, the second zone identifier and the first zone identifier are jointly used to determine that a distance between the third node U3 and the first node U1 is greater than a first threshold, the first node U1 drops transmitting the first signal in the first radio resource set.

In one subsidiary embodiment of the above subembodiment, the first threshold is a fixed one, or the first threshold is configured by an RRC signaling.

In one subsidiary embodiment of the above subembodiment, the second zone identifier in the present disclosure is a ZoneID.

In one subsidiary embodiment of the above subembodiment, the second zone identifier in the present disclosure is a non-negative integer.

In one embodiment, the target signaling is used to indicate the first radio resource set.

In one embodiment, the target signaling is used to determine the first radio resource set.

In one embodiment, time-domain resources occupied by the target signal are used to determine time-domain resources occupied by the first radio resource set.

In one embodiment, frequency-domain resources occupied by the target signal are used to determine frequency-domain resources occupied by the first radio resource set.

In one embodiment, the target signal is a radio signal.

In one embodiment, the target signal is a baseband channel.

In one embodiment, a physical layer channel bearing the target signaling includes a PSCCH.

In one embodiment, a physical layer channel bearing the target signal includes a PSSCH.

In one embodiment, a first sequence is used to generate the first signal, the first sequence comprising at least one of a pseudo-random sequence or a Zadoff-Chu sequence.

In one embodiment, the target reference signal corresponds to a target reference signal identifier.

In one embodiment, the target reference signal is used to determine a spatial receive parameter employed by the third node U3 in the first radio resource set.

In one embodiment, the target reference signal is used to determine a spatial transmission parameter employed by the first node U1 in the first radio resource set.

In one embodiment, a transmission antenna port for the first node U1 in the first radio resource set is a first reference signal, the first reference signal being QCL with the target reference signal.

In one embodiment, the first radio resource pool and the second radio resource pool respectively correspond to a first index and a second index, the first index being different from the second index.

In one subembodiment, the first index is associated with the first TRP in the present disclosure, while the second index is associated with the second TRP in the present disclosure, both the first TRP and the second TRP are TRPs under a serving cell for the first node.

In one subembodiment, the first index and the second index are respectively used to identify two Control Resource Sets (CORESETs).

In one subembodiment, a cell identifier of a serving cell for the first node U1 is a first cell ID, radio signals transmitted in the first radio resource pool are simultaneously scrambled by the first cell ID and a first index.

In one subembodiment, a cell identifier of a serving cell for the first node U1 is a first cell ID, radio signals transmitted in the second radio resource pool are simultaneously scrambled by the first cell ID and a second index.

In one embodiment, the detection includes energy detection.

In one embodiment, the detection includes blind detection.

In one embodiment, the detection includes sequence detection.

In one embodiment, the detection includes coherent detection.

In one embodiment, it is unknown to the third node U3 whether the first signal is transmitted before receiving the first signal.

Embodiment 6

Figure 6:
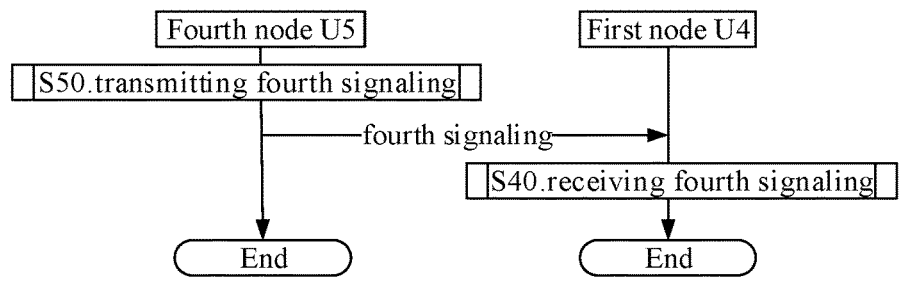
FIG. 6 illustrates a flowchart of a fourth signaling according to one embodiment of the present disclosure.

Embodiment 6 illustrates a schematic diagram of a fourth signaling according to one embodiment of the present disclosure, as shown in FIG. 6. In FIG. 6, a first node U4 and a fourth node U5 are in wireless communications.

The first node U4 receives a fourth signaling in step S40.

The fourth node U5 transmits a fourth signaling in step S50.

In Embodiment 6, the fourth signaling is used to determine a first radio resource set in the present disclosure.

In one embodiment, the fourth signaling is used to indicate the first radio resource set.

In one embodiment, the fourth signaling is transmitted in sidelink.

In one embodiment, the fourth signaling is transmitted in downlink.

In one embodiment, the fourth signaling is a MAC Control Element (MAC CE).

In one embodiment, the fourth signaling is an RRC signaling.

In one embodiment, the fourth signaling is a higher layer signaling.

In one embodiment, the fourth signaling is SCI.

In one embodiment, the fourth node U5 is a base station for a serving cell of the first node U4.

In one embodiment, the fourth node U5 is the second node N2 in the present disclosure.

In one embodiment, the fourth node U5 is the third node U3 in the present disclosure.

Embodiment 7

Figure 7:
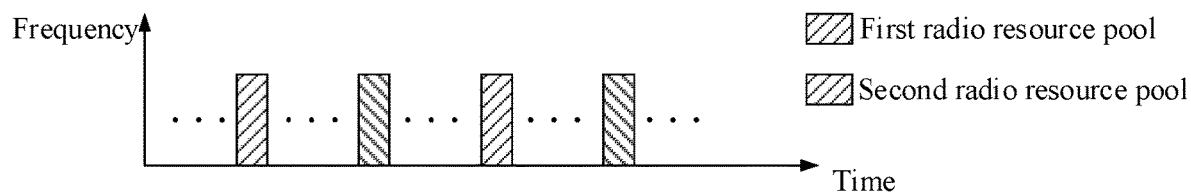
FIG. 7 illustrates a schematic diagram of a first radio resource pool and a second radio resource pool according to one embodiment of the present disclosure.

Embodiment 7 illustrates a schematic diagram illustrating a first radio resource pool and a second radio resource pool according to one embodiment of the present disclosure, as shown in FIG. 7. In Embodiment 7, Resource Elements (REs) occupied by the first radio resource pool and those occupied by the second radio resource pool are orthogonal.

In one embodiment, the phrase that REs occupied by the first radio resource pool and REs occupied by the second radio resource pool are orthogonal has a meaning that there isn't an RE belonging to the first radio resource pool and the second radio resource pool simultaneously.

In one embodiment, the first radio resource pool and the second radio resource pool are Time-Domain Multiplexing (TDM); or the first radio resource pool and the second radio resource pool are Frequency-Domain Multiplex (FDM).

In one embodiment, the first radio resource pool occupies Q1 multicarrier symbols in time domain, where Q1 is a positive integer greater than 1.

In one subembodiment, the Q1 multicarrier symbols are discrete in time domain.

In one embodiment, the second radio resource pool occupies Q2 multicarrier symbols in time domain, where Q2 is a positive integer greater than 1.

In one subembodiment, the Q2 multicarrier symbols are discrete in time domain.

In one embodiment, multicarrier symbols comprised in the first radio resource pool and multicarrier symbols comprised in the second radio resource pool are interleaved in time domain.

Embodiment 8

Figure 8:
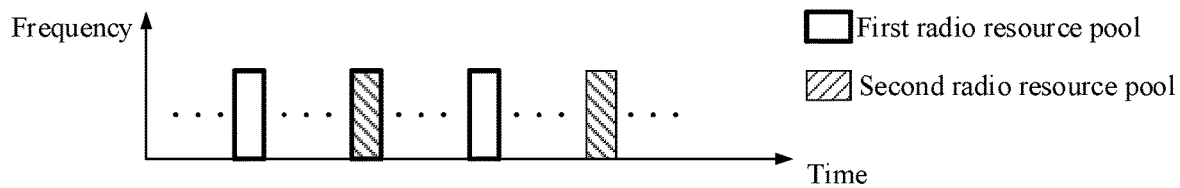
FIG. 8 illustrates a schematic diagram of a first radio resource pool and a second radio resource pool according to another embodiment of the present disclosure.

Embodiment 8 illustrates another schematic diagram of a first radio resource pool and a second radio resource pool, as shown in FIG. 8. In FIG. 8, the first radio resource pool comprises K1 radio resource sets, while the second radio resource pool comprises K2 radio resource sets; there is at least one first-type radio resource set among the K1 radio resource sets, and there is at least one second-type radio resource set among the K2 radio resource sets, the first-type radio resource set occupy the same REs as the second-type radio resource set.

In one embodiment, the first radio resource pool and the second radio resource pool respectively correspond to different spatial-domain resources.

In one embodiment, the first radio resource pool and the second radio resource pool respectively correspond to different spatial transmission parameter groups.

In one embodiment, the first radio resource pool and the second radio resource pool respectively correspond to different spatial receive parameter groups.

In one embodiment, the first radio resource pool and the second radio resource pool respectively correspond to different antenna ports.

In one embodiment, the first radio resource pool and the second radio resource pool respectively correspond to different reference signals, or the first radio resource pool and the second radio resource pool respectively correspond to different reference signal identifiers.

Embodiment 9

Figure 9:
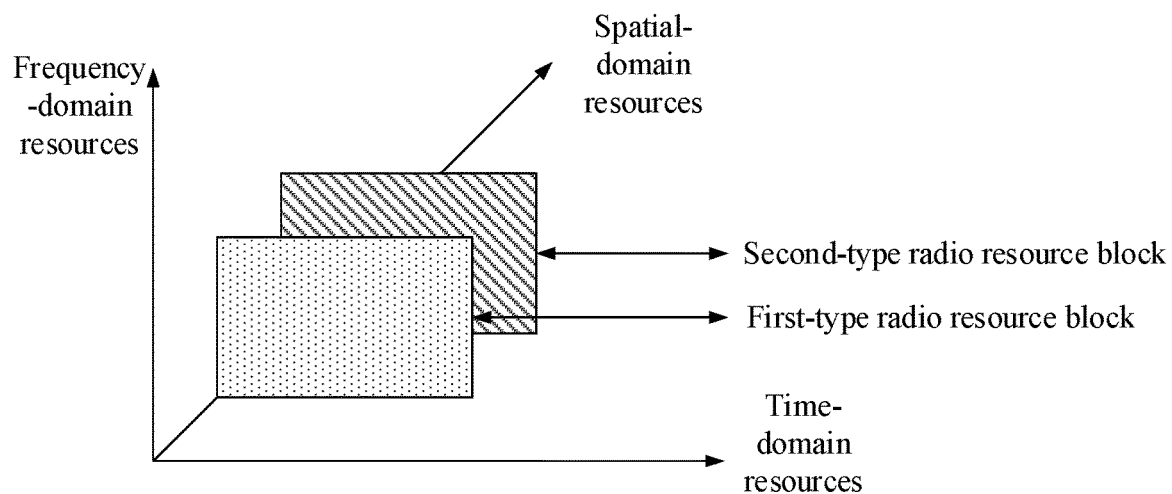
FIG. 9 illustrates a schematic diagram of a first-type radio resource set and a second-type radio resource set according to one embodiment of the present disclosure.

Embodiment 9 illustrates a schematic diagram of a first radio resource set and a second radio resource set, as shown in FIG. 9. In FIG. 9, the first-type radio resource set and the second-type radio resource set respectively belong to the first radio resource pool and the second radio resource pool in the present disclosure; and the first-type radio resource set and the second-type radio resource set occupy a same time-frequency resource.

In one embodiment, the first node in the present disclosure employs different spatial transmission parameters respectively for transmitting radio signals in the first-type radio resource set and the second-type radio resource set.

In one embodiment, the second node in the present disclosure employs different spatial receive parameters respectively for receiving radio signals in the first-type radio resource set and the second-type radio resource set.

In one embodiment, the first-type radio resource set and the second-type radio resource set are respectively associated with different antenna ports.

In one embodiment, the first-type radio resource set and the second-type radio resource set are respectively associated with different reference signals.

Embodiment 10

Figure 10:
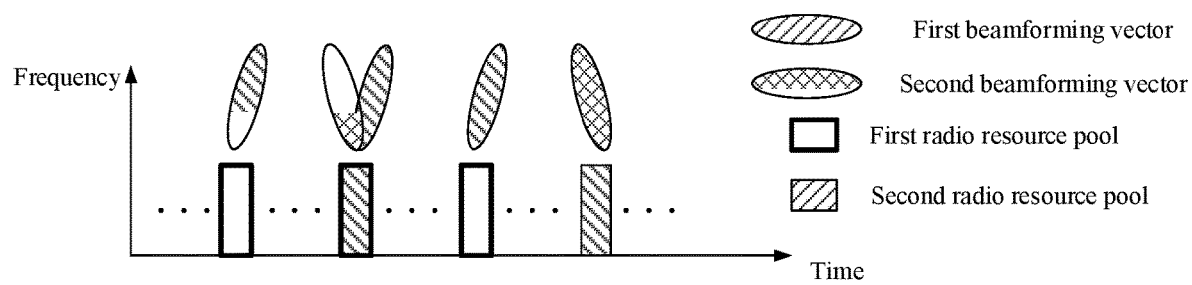
FIG. 10 illustrates a schematic diagram of a first radio resource pool and a second radio resource pool as well as corresponding beamforming vectors according to one embodiment of the present disclosure.

Embodiment 10 illustrates a schematic diagram of a first radio resource pool and a second radio resource pool as well as corresponding beamforming vectors. In FIG. 10, the first radio resource pool corresponds to a first beamforming vector, while the second radio resource pool corresponds to a second beamforming vector.

In one embodiment, the first beamforming vector and the second beamforming vector respectively correspond to different spatial receive parameters.

In one embodiment, the first beamforming vector and the second beamforming vector respectively correspond to different spatial transmission parameters.

In one embodiment, the first beamforming vector and the second beamforming vector respectively correspond to different reference signals.

In one embodiment, the first beamforming vector and the second beamforming vector respectively correspond to different transmission antenna ports.

Embodiment 11

Figure 11:
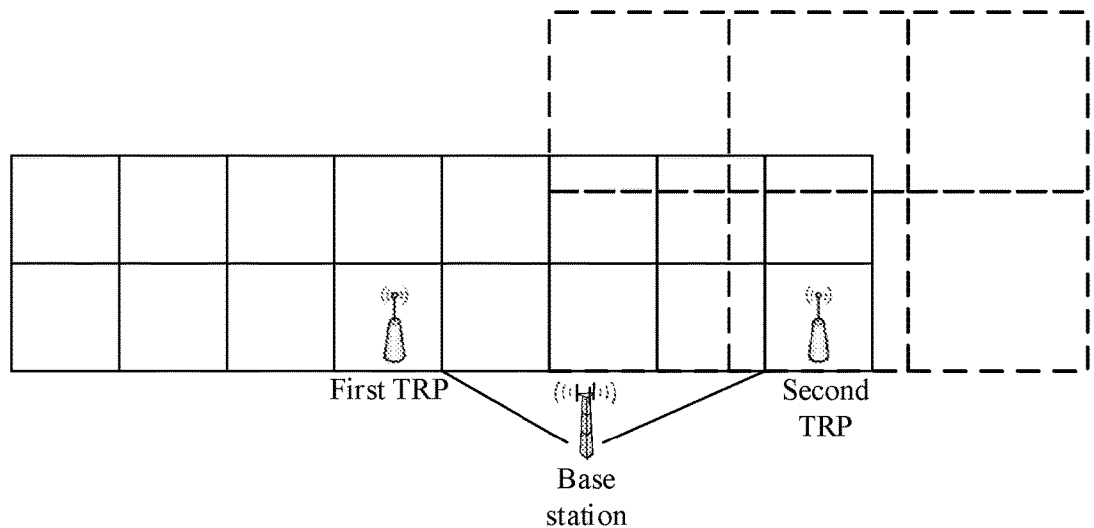
FIG. 11 illustrates a schematic diagram of a first zone size and a second zone size according to one embodiment of the present disclosure.

Embodiment 11 illustrates a schematic diagram of a first zone size and a second zone size as shown in FIG. 11. In FIG. 11, rectangular boxes framed with solid lines correspond to a zone divided according to the first zone size, while rectangular boxes framed with broken lines correspond to a zone divided according to the second zone size.

In one embodiment, the division based off the first zone size illustrated below is zoning centered on a first TRP.

In one embodiment, the division based off the second zone size illustrated below is zoning centered on a second TRP.

In one embodiment, the first zone size comprises a first zone length and a first zone width, while the second zone size comprises a second zone length and a second zone width; the first zone length is unequal to the second zone length, or the first zone width is unequal to the second zone width.

Embodiment 12

Figure 12:
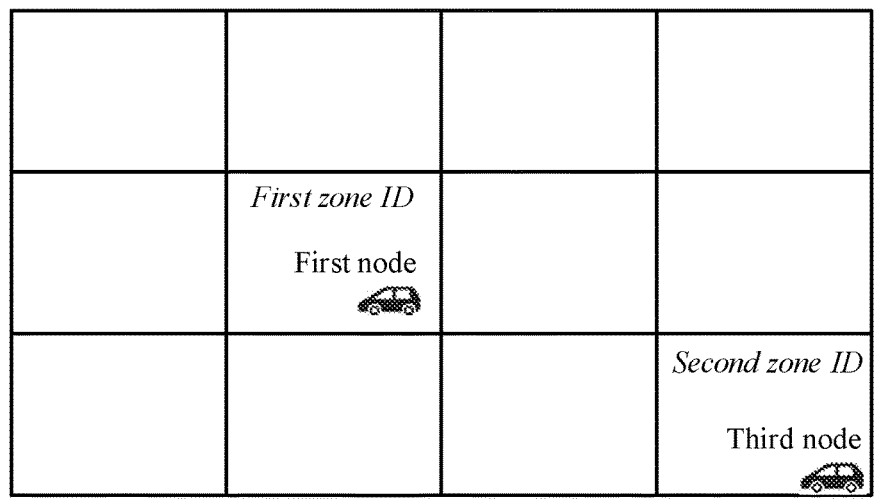
FIG. 12 illustrates a schematic diagram of a positional relation between a first node and a second node according to one embodiment of the present disclosure.

Embodiment 12 illustrates a schematic diagram of relationship between a first node and a third node, as shown in FIG. 12. In FIG. 12, each rectangular box represents a zone;

where the first node is currently located is used by the first node to determine a first zone identifier, and where the third node is currently located is used by the third node to determine a second zone identifier.

In one embodiment, the first node and the third node determine zone identifiers for respective locations according to a same zone size.

In one embodiment, a difference between the first zone identifier and the second zone identifier is used by the first node to determine a distance between the first node and the third node.

In one subembodiment, the distance between the first node and the third node is used by the first node for determining whether to transmit the first signal.

In one embodiment, when the first radio resource set is associated with the first radio resource pool, the first zone size is used to determine the first zone identifier.

Embodiment 13

Figure 13:
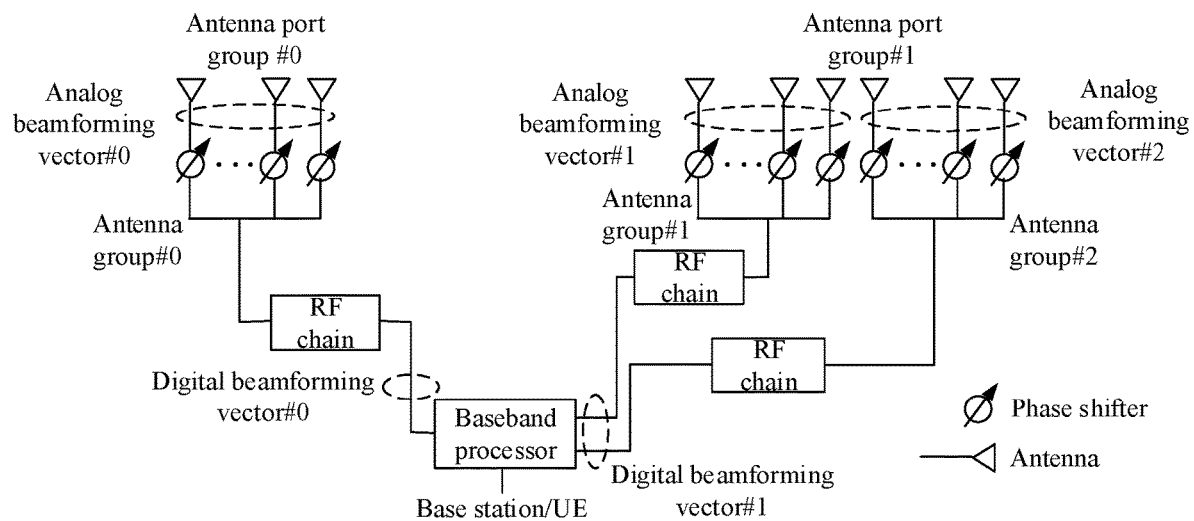
FIG. 13 illustrates a schematic diagram of a node's antenna structure according to one embodiment of the present disclosure.

Embodiment 13 illustrates a schematic diagram of antennas and antenna ports, as shown in FIG. 13.

In Embodiment 13, an antenna port group is comprised of a positive integer number of antenna port(s); an antenna port is formed by superimposing antennas in a positive integer number of antenna group(s) through antenna virtualization; an antenna group is comprised of a positive integer number of antenna(s). One antenna group is connected to a baseband processor through a Radio Frequency (RF) chain, so each antenna group corresponds to a different RF chain Mapping coefficients of all antennas in a positive integer number of antenna group(s) comprised by a given antenna port to the given antenna port constitute a beamforming vector corresponding to the given antenna port. Mapping coefficients of multiple antennas comprised in any given one of a positive integer number of antenna groups comprised by the given antenna port to the given antenna port constitute an analog beamforming vector for the given antenna port. Analog beamforming vectors respectively corresponding to the positive integer number of antenna groups are diagonally arranged to form an analog beamforming matrix corresponding to the given antenna port. Mapping coefficients of the positive integer number of antenna groups to the given antenna port constitute a digital beamforming vector corresponding to the given antenna port. A beamforming vector corresponding to the given antenna port is a product of the analog beamforming matrix and the digital beamforming vector respectively corresponding to the given antenna port. Each antenna port in antenna port group is composed of (a) same antenna group(s), and different antenna ports in a same antenna port group correspond to different beamforming vectors.

FIG. 13 illustrates two antenna port groups, which are antenna port group #0 and antenna port group #1. Herein, the antenna port group is composed of antenna group #0, while the antenna port group #1 is composed of antenna group #1 and antenna group #2. Mapping coefficients of multiple antennas comprised in the antenna group #0 to the antenna port group #0 constitute an analog beamforming vector #0; a mapping coefficient of the antenna group #0 to the antenna port group #0 constitute a digital beamforming vector #0. Mapping coefficients of multiple antennas comprised in the antenna group #1 to the antenna port group #1 and mapping coefficients of multiple antennas comprised in the antenna group #2 to the antenna port group #1 respectively constitute an analog beamforming vector #1 and an analog beamforming vector #2; respective mapping coefficients of the antenna group #1 and the antenna group #2 to the antenna port group #1 constitute a digital beamforming vector #1. A beamforming vector corresponding to any antenna port comprised by the antenna port group #0 is a product of the analog beamforming vector #0 and the digital beamforming vector #0. A beamforming vector corresponding to any antenna port comprised by the antenna port group #1 is a product of the digital beamforming vector #1 and an analog beamforming matrix formed by diagonally arrangement of the analog beamforming vector #1 and the analog beamforming vector #2.

In one subembodiment, an antenna port group comprises one antenna port. For example, the antenna port group #0 in FIG. 13 comprises one antenna port.

In one subsidiary embodiment of the above subembodiment, an analog beamforming matrix corresponding to the one antenna port is dimensionally reduced to an analog beamforming vector, while a digital beamforming vector corresponding to the one antenna port is dimensionally reduced to a scaler, a beamforming vector corresponding to the one antenna port is equivalent to an analog beamforming vector corresponding to the one antenna port.

In one subembodiment, an antenna port group comprises multiple antenna ports. For example, the antenna port group #1 in FIG. 13 comprises multiple antenna ports.

In one subsidiary embodiment of the above subembodiment, the multiple antenna ports correspond to a same analog beamforming matrix and different digital beamforming vectors.

In one subembodiment, antenna ports in different antenna port groups correspond to different analog beamforming matrices.

In one subembodiment, any two antenna ports in an antenna port group are Quasi-Colocated (QCL).

In one subembodiment, any two antenna ports in an antenna port group are spatial QCL.

Embodiment 14

Figure 14:
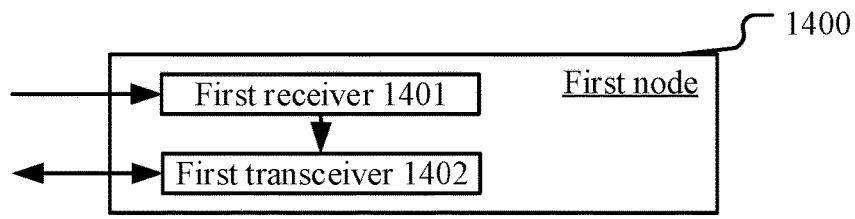
FIG. 14 illustrates a structure block diagram used in a first node according to one embodiment of the present disclosure.

Embodiment 14 illustrates a structure block diagram of a first node, as shown in FIG. 14. In FIG. 14, a first node 1400 is comprised of a first receiver 1401 and a first transceiver 1402.

The first receiver 1401 receives a first signaling and a second signaling, the first signaling being used to indicate a first zone size and a second zone size, while the second signaling indicating a first radio resource pool and a second radio resource pool;

the first transceiver 1402 determines according to a current location whether to transmit a first signal; when the determination result is yes, transmits the first signal in a first radio resource set; when the determination result is no, drops transmission of the first signal in a first radio resource set.

In Embodiment 14, when the first radio resource set is associated with the first radio resource pool, the first zone size is used to determine the current location; when the first radio resource set is associated with the second radio resource pool, the second zone size is used to determine the current location.

In one embodiment, the first transceiver 1402 transmits a third signaling; the third signaling is used to indicate the first radio resource pool and the second radio resource pool.

In one embodiment, the first receiver 1401 receives a fourth signaling; the fourth signaling is used to determine the first radio resource set.

In one embodiment, the first transceiver 1402 receives a target signaling and a target signal; the target signaling comprises configuration information for the target signal, the first signal being used for feedback for the target signal; the target signaling and the target signal are transmitted in sidelink.

In one embodiment, the first transceiver 1402 receives a fifth signaling; the fifth signaling is used to indicate a target reference signal, the target reference signal being associated with the first radio resource set.

In one embodiment, the first radio resource pool and the second radio resource pool respectively correspond to a first index and a second index, the first index being different from the second index.

In one embodiment, the first receiver 1401 comprises at least the first four of the antenna 452, the receiver 454, the multi-antenna receiving processor 458, the receiving processor 456 and the controller/processor 459 in Embodiment 4.

In one embodiment, the first transceiver 1402 comprises at least the first six of the antenna 452, the receiver/transmitter 454, the multi-antenna receiving processor 458, the receiving processor 456, the multi-antenna transmitting processor 457, the transmitting processor 468 and the controller/processor 459 in Embodiment 4.

Embodiment 15

Figure 15:
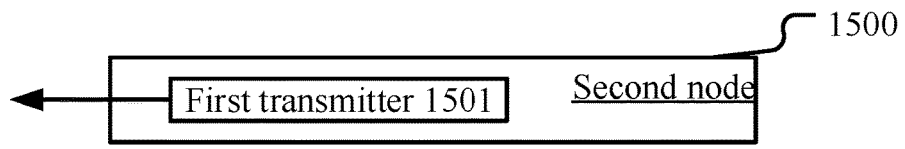
FIG. 15 illustrates a structure block diagram used in a second node according to one embodiment of the present disclosure.

Embodiment 15 illustrates a structure block diagram of a second node, as shown in FIG. 15. In FIG. 15, a second node 1500 comprises a first transmitter 1501.

The first transmitter 1501 transmits a first signaling and a second signaling, the first signaling being used to indicate a first zone size and a second zone size, while the second signaling indicating a first radio resource pool and a second radio resource pool.

In Embodiment 15, a first node determines whether to transmit a first signal according to its current location; when the determination result is yes, the first node transmits the first signal in the first radio resource set; when the determination result is no, the first node drops transmitting the first signal in the first radio resource set; when the first radio resource set is associated with the first radio resource pool, the first zone size is used to determine the current location of the first node; when the first radio resource set is associated with the second radio resource pool, the second zone size is used to determine the current location of the first node.

In one embodiment, the first transmitter 1501 transmits a fourth signaling; the fourth signaling is used to determine the first radio resource set.

In one embodiment, the first radio resource pool and the second radio resource pool respectively correspond to a first index and a second index, the first index being different from the second index.

In one embodiment, the first transmitter 1501 comprises at least the first four of the antenna 420, the transmitter 418, the multi-antenna transmitting processor 471, the transmitting processor 416 and the controller/processor 475 in Embodiment 4.

Embodiment 16

Figure 16:
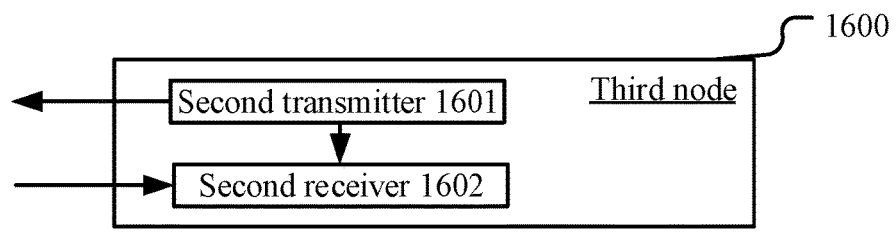
FIG. 16 illustrates a structure block diagram used in a third node according to one embodiment of the present disclosure.

Embodiment 16 illustrates a structure block diagram of a third node, as shown in FIG. 16. In FIG. 16, a third node 1600 in a second node comprises a second transmitter 1601 and a second receiver 1602.

The second transmitter 1601 transmits a target signaling and a target signal.

The second receiver 1602 detects a first signal in a first radio resource set.

In Embodiment 16, the target signaling comprises configuration information for the target signal, the first signal is used for a feedback for the target signal, both the target signaling and the target signal are transmitted in sidelink; a transmitter for the first signal is a first node, and a first node determines whether to transmit a first signal according to its current location; when the determination result is yes, the first node transmits the first signal in the first radio resource set; when the determination result is no, the first node drops transmitting the first signal in the first radio resource set; when the first radio resource set is associated with the first radio resource pool, the first zone size is used to determine the current location of the first node; when the first radio resource set is associated with the second radio resource pool, the second zone size is used to determine the current location of the first node.

In one embodiment, the second receiver 1602 receives a third signaling; the third signaling is used to indicate the first radio resource pool and the second radio resource pool.

In one embodiment, the second transmitter 1601 transmits a fourth signaling; the fourth signaling is used to determine the first radio resource set.

In one embodiment, the second transmitter 1601 transmits a fifth signaling; the fifth signaling is used to indicate a target reference signal, the target reference signal being associated with the first radio resource set.

In one embodiment, the first radio resource pool and the second radio resource pool respectively correspond to a first index and a second index, the first index being different from the second index.

In one embodiment, the second transmitter 1601 comprises at least the first four of the antenna 420, the transmitter 418, the multi-antenna transmitting processor 471, the transmitting processor 416 and the controller/processor 475 in Embodiment 4.

In one embodiment, the second receiver 1602 comprises at least the first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, characterized in comprising:
    a first receiver, receiving a first signaling and a second signaling, the first signaling being used to indicate a first zone size and a second zone size, while the second signaling indicating a first radio resource pool and a second radio resource pool; and
    a first transceiver, determining according to a current location whether to transmit a first signal; when the determination result is yes, transmitting the first signal in a first radio resource set; when the determination result is no, dropping transmission of the first signal in a first radio resource set;
    wherein when the first radio resource set is associated with the first radio resource pool, the first zone size is used to determine the current location; when the first radio resource set is associated with the second radio resource pool, the second zone size is used to determine the current location; the first radio resource pool and the second radio resource pool respectively correspond to a first index and a second index, the first index being different from the second index; the first radio resource pool is associated with a first TRP, while the second radio resource pool is associated with a second TRP, the first TRP and the second TRP are two TRPs under a serving cell for the first node, the first index is used to indicate the first TRP, while the second index is used to indicate the second TRP.

2. The first node according to claim 1, wherein the first transceiver transmits a third signaling; the third signaling is used to indicate the first radio resource pool and the second radio resource pool.

3. The first node according to claim 1, wherein the first receiver receives a fourth signaling; the fourth signaling is used to determine the first radio resource set.

4. The first node according to claim 1, wherein the first transceiver receives a target signaling and a target signal; the target signaling comprises configuration information for the target signal, the first signal being used for feedback for the target signal; the target signaling and the target signal are transmitted in sidelink.

5. The first node according to claim 1, wherein the first transceiver receives a fifth signaling; the fifth signaling is used to indicate a target reference signal, the target reference signal being associated with the first radio resource set.

6. The first node according to claim 1, wherein the first radio resource pool and the second radio resource pool respectively correspond to a first index and a second index, the first index being different from the second index.

7. The first node according to claim 1, wherein the phrase that the first radio resource set is associated with the first radio resource pool comprises at least one of the following meanings:
    the first radio resource set is a radio resource set of K1 radio resource sets comprised in the first radio resource pool; where K1 is a positive integer;
    the first radio resource set and the first radio resource pool are configured with a same transmission antenna port;
    the first radio resource set and the first radio resource pool adopt a same transmission antenna port;
    the first radio resource set and the first radio resource pool correspond to a same RS;
    an RS which is QCL with a transmission antenna port adopted by the first radio resource set is the same as an RS which is QCL with a transmission antenna port for the first radio resource pool.

8. The first node according to claim 1, wherein the phrase that the first radio resource set is associated with the second radio resource pool comprises at least one of the following meanings:
    the first radio resource set is a radio resource set of K2 radio resource sets comprised in the second radio resource pool; where K2 is a positive integer;
    the first radio resource set and the second radio resource pool are configured with a same transmission antenna port;
    the first radio resource set and the second radio resource pool adopt a same transmission antenna port;
    the first radio resource set and the second radio resource pool correspond to a same RS;
    an RS which is QCL with a transmission antenna port adopted by the first radio resource set is the same as an RS which is QCL with a transmission antenna port for the second radio resource pool.

9. The first node according to claim 1, wherein the phrase that the first radio resource set is associated with the first radio resource pool comprises at least one of the following meanings:
    a transmission antenna port for the first radio resource set is QCL with a transmission antenna port or ports respectively for at least one radio resource set in the first radio resource pool;
    a transmission antenna port for the first radio resource set is QCL with a first reference signal, and a transmission antenna port/ports respectively for at least one radio resource set in the first radio resource pool is/are QCL with the first reference signal.

10. The first node according to claim 1, wherein the phrase that the first radio resource set is associated with the second radio resource pool comprises at least one of the following meanings:
    a transmission antenna port for the first radio resource set is QCL with a transmission antenna port or ports respectively for at least one radio resource set in the second radio resource pool;
    a transmission antenna port for the first radio resource set is QCL with a second reference signal, and a transmission antenna port/ports respectively for at least one radio resource set in the second radio resource pool is/are QCL with the second reference signal.

11. The first node according to claim 1, wherein the first signal is transmitted in sidelink; the first signal is a HARQ-ACK for a data channel in sidelink, or the first signal is feedback for sidelink.

12. The first node according to claim 1, wherein the first zone size comprises a first zone length and a first zone width, the first zone length being equal to X1 meters, and the first zone width being equal to Y1 meters, where both X1 and Y1 are positive integers greater than 1; a product of X1 and Y1 denotes what size the first zone size is.

13. The first node according to claim 1, wherein the second zone size comprises a second zone length and a second zone width, the second zone length being equal to X2 meters, and the second zone width being equal to Y2 meters, where both X2 and Y2 are positive integers greater than 1; a product of X2 and Y2 denotes what size the second zone size is.

14. The first node according to claim 1, wherein the phrase that the first zone size is used to determine the current location comprises a meaning that the first node determines according to the first zone size a target zone to which the current location of the first node belongs, the target zone corresponding to a first zone identifier; the target zone is used to determine information for the first node's location relative to a base station for a serving cell for the first node by the first zone size; or, the target zone is used to determine information for the first node's location relative to a first TRP by the first zone size.

15. The first node according to claim 1, wherein the phrase that the second zone size is used to determine the current location comprises a meaning that the first node determines according to the second zone size a target zone to which the current location of the first node belongs, the target zone corresponding to a first zone identifier; the target zone is used to determine information for the first node's location relative to a base station for a serving cell for the first node by the second zone size; or, the target zone is used to determine information for the first node's location relative to a second TRP by the first zone size.

16. The first node according to claim 14, wherein the first zone identifier is a ZoneID.

17. The first node according to claim 15, wherein the first zone identifier is a ZoneID.

18. A second node for wireless communications, characterized in comprising:
a first transmitter, transmitting a first signaling and a second signaling, the first signaling being used to indicate a first zone size and a second zone size, while the second signaling indicating a first radio resource pool and a second radio resource pool;
wherein a first node receiving the first signaling and the second signaling and determines whether to transmit a first signal according to its current location; when the determination result is yes, the first node transmits the first signal in a first radio resource set; when the determination result is no, the first node drops transmitting the first signal in the first radio resource set; when the first radio resource set is associated with the first radio resource pool, the first zone size is used to determine the current location of the first node; when the first radio resource set is associated with the second radio resource pool, the second zone size is used to determine the current location of the first node; the first radio resource pool and the second radio resource pool respectively correspond to a first index and a second index, the first index being different from the second index; the first radio resource pool is associated with a first TRP, while the second radio resource pool is associated with a second TRP, the first TRP and the second TRP are two TRPs under a serving cell for the first node, the first index is used to indicate the first TRP, while the second index is used to indicate the second TRP.

19. A method in a first node for wireless communications, characterized in comprising:
receiving a first signaling and a second signaling, the first signaling being used to indicate a first zone size and a second zone size, while the second signaling indicating a first radio resource pool and a second radio resource pool; and
determining according to a current location whether to transmit a first signal; when the determination result is yes, transmitting the first signal in a first radio resource set; when the determination result is no, dropping transmission of the first signal in a first radio resource set;
wherein when the first radio resource set is associated with the first radio resource pool, the first zone size is used to determine the current location; when the first radio resource set is associated with the second radio resource pool, the second zone size is used to determine the current location; the first radio resource pool and the second radio resource pool respectively correspond to a first index and a second index, the first index being different from the second index; the first radio resource pool is associated with a first TRP, while the second radio resource pool is associated with a second TRP, the first TRP and the second TRP are two TRPs under a serving cell for the first node, the first index is used to indicate the first TRP, while the second index is used to indicate the second TRP.

* * * * *